US012795348B2

(12) United States Patent
Liu et al.

(10) Patent No.: US 12,795,348 B2
(45) Date of Patent: Nov. 10, 2026

(54) MULTI-DEVICE COLLABORATION CONTROL METHOD AND APPARATUS, AND READABLE STORAGE MEDIUM

(71) Applicant: Beijing Xiaomi Mobile Software Co., Ltd., Beijing (CN)

(72) Inventors: Jianning Liu, Beijing (CN); Yang Shen, Beijing (CN); Haoran Liang, Beijing (CN); Zhengyi Shang, Beijing (CN); Wei Lu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 92 days.

(21) Appl. No.: 18/867,988

(22) PCT Filed: May 27, 2022

(86) PCT No.: PCT/CN2022/095744
§ 371 (c)(1),
(2) Date: Nov. 21, 2024

(87) PCT Pub. No.: WO2023/226030
PCT Pub. Date: Nov. 30, 2023

(65) Prior Publication Data
US 2026/0197626 A1 Jul. 9, 2026

(51) Int. Cl.
*H04W 8/18* (2009.01)
*G06F 9/50* (2006.01)
*H04L 51/18* (2022.01)

(52) U.S. Cl.
CPC .......... *H04W 8/183* (2013.01); *G06F 9/5083* (2013.01); *H04L 51/18* (2013.01)

(58) Field of Classification Search
CPC ....... H04W 8/183; G06F 9/5083; H04L 51/18
See application file for complete search history.

(56) References Cited

U.S. PATENT DOCUMENTS

2019/0064913 A1* 2/2019 O'Brien .................... G06F 1/28
2022/0166738 A1* 5/2022 Gray ........................ G06F 40/30
2022/0361097 A1* 11/2022 Sur ....................... H04W 28/06
2023/0144062 A1* 5/2023 Liu ......................... H04L 67/10
709/224

FOREIGN PATENT DOCUMENTS

CN 113542316 A 10/2021
CN 113873648 A 12/2021
CN 114065706 A 2/2022

OTHER PUBLICATIONS

International Search Report issued Jan. 19, 2023 in PCT/CN2022/095744, filed on May 27, 2022, 4 pages (with English Translation).
Combined Chinese Office Action and Search Report issued Mar. 31, 2026 in Chinese Patent Application No. 202280001778.7 with English translation, 21 pgs.

* cited by examiner

*Primary Examiner* — Anh Nguyen
(74) *Attorney, Agent, or Firm* — Oblon, McClelland, Maier & Neustadt, L.L.P.

(57) ABSTRACT

A multi-device collaboration control method includes: sending a task demand message to at least one second user equipment, wherein the task demand message comprises task information; and receiving a response message of the at least one second user equipment, wherein the response message comprises equipment information of the second user equipment.

17 Claims, 6 Drawing Sheets

MULTI-DEVICE COLLABORATION CONTROL METHOD AND APPARATUS, AND READABLE STORAGE MEDIUM

CROSS-REFERENCE TO RELATED APPLICATIONS

The present application is a U.S. National Stage of International Application No. PCT/CN2022/095744, filed on May 27, 2022, the disclosure of which is incorporated herein by reference in its entirety for all purposes.

TECHNICAL FIELD

The present disclosure relates to the field of wireless communication technology, and in particular to a control method for multi-device collaboration and apparatus, and a readable storage medium.

BACKGROUND

With the development of technology, different electronic devices have different performance advantages, so users can choose suitable electronic devices according to their main needs. However, as the usage scenarios change, users may have different needs, and it is necessary to provide application methods that meet the needs of users in different scenarios.

SUMMARY

The present disclosure provides a control method for multi-device collaboration and apparatus, and a readable storage medium.

In a first aspect, the present disclosure provides a control method for multi-device collaboration, which is performed by a first user equipment, and the method includes:

- sending a task requirement message to at least one second user equipment, where the task requirement message includes task information; and
- receiving a response message of at least one second user equipment, where the response message includes equipment information of the second user equipment.

In a second aspect, the present disclosure provides a control method for multi-device collaboration, which is performed by a second user equipment, and the method includes:

- receiving a task requirement message from a first user equipment, where the task requirement message includes task information;
- sending a response message to the first user equipment, where the response message includes equipment information of the second user equipment.

In a third aspect, the present disclosure provides a control method for multi-device collaboration, which is performed by a network device, and the method includes:

- receiving a task requirement message sent by a first user equipment, where the task requirement message includes task information; and
- issuing the task requirement message.

In a fourth aspect, the present disclosure provides a multi-device collaboration control apparatus, which can be configured to execute the steps performed by the first user equipment in the first aspect or any possible design of the first aspect. The first user equipment can implement the functions in the above methods in the form of a hardware structure, a software module, or a hardware structure plus a software module.

When the apparatus shown in the fourth aspect is implemented by the software module, the apparatus may include a transceiving module, where the transceiving module can be configured to support the communication apparatus to perform communication.

When executing the steps described in the first aspect above, the transceiving module is configured to send a task requirement message to at least one second user equipment, and the task requirement message includes task information; the transceiving module is further configured to receive a response message from the at least one second user equipment, and the response message includes equipment information of the second user equipment.

In a fifth aspect, the present disclosure provides a multi-device collaboration control apparatus, which can be configured to execute the steps performed by the second user equipment in the second aspect or any possible design of the second aspect. The second user equipment can implement the functions in the above methods in the form of a hardware structure, a software module, or a hardware structure plus a software module.

When the apparatus shown in the fifth aspect is implemented by the software module, the apparatus may include a transceiving module, where the transceiving module can be configured to support the communication apparatus to communicate.

When executing the steps described in the second aspect above, the transceiving module is configured to receive a task requirement message from a first user equipment, where the task requirement message includes task information; and the transceiving module is further configured to send a response message to the first user equipment, where the response message includes equipment information supported by the second user equipment.

In a sixth aspect, the present disclosure provides a multi-device collaboration control apparatus, which can be configured to execute the steps performed by the network device in the third aspect or any possible design of the third aspect. The network device can implement the functions in the above methods in the form of a hardware structure, a software module, or a hardware structure plus a software module.

When the apparatus shown in the sixth aspect is implemented by the software module, the apparatus may include a transceiving module, where the transceiving module can be configured to support the communication apparatus to communicate.

When executing the steps described in the third aspect above, the transceiving module is configured to receive a task requirement message sent by a first user equipment, where the task requirement message includes task information; and the transceiving module is further configured to issue the task requirement message.

In a seventh aspect, the present disclosure provides an electronic device, including a processor and a memory; the memory is configured to store a computer program; and the processor is configured to execute the computer program to implement the first aspect or any possible design of the first aspect.

In an eighth aspect, the present disclosure provides an electronic device, including a processor and a memory; the memory is configured to store a computer program; and the processor is configured to execute the computer program to implement the second aspect or any possible design of the second aspect.

In a ninth aspect, the present disclosure provides a communication apparatus, including a processor and a memory; the memory is configured to store a computer program; and the processor is configured to execute the computer program to implement the third aspect or any possible design of the third aspect.

In a tenth aspect, the present disclosure provides a computer-readable storage medium having stored therein instructions (or called a computer program or a program) which, when being called and executed on a computer, cause the computer to perform the above first aspect or any possible design of the first aspect.

In the eleventh aspect, the present disclosure provides a computer-readable storage medium having stored therein instructions (or called a computer program or a program) which, when being called and executed on a computer, cause the computer to perform the above second aspect or any possible design of the second aspect.

In the twelfth aspect, the present disclosure provides a computer-readable storage medium having stored therein instructions (or called a computer program or a program) which, when being called and executed on a computer, cause the computer to perform the above third aspect or any possible design of the third aspect.

It is to be understood that the foregoing general description and the following detailed description are illustrative and explanatory only and cannot restrict the present disclosure.

BRIEF DESCRIPTION OF THE DRAWINGS

The accompanying drawings herein are incorporated in and constitute a part of the specification, illustrate embodiments consistent with the embodiments of the present disclosure, and together with the description, serve to explain the principles of the embodiments of the present disclosure.

DETAILED DESCRIPTION

Figure 1:
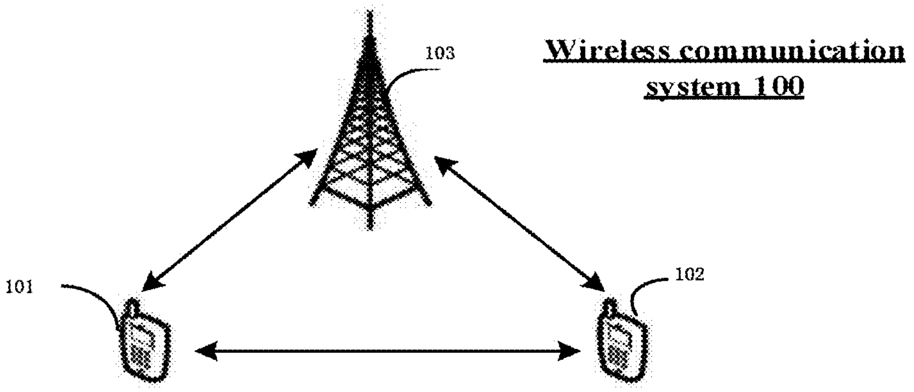
FIG. 1 is a schematic diagram of a wireless communication system architecture provided by an embodiment of the present disclosure.

Illustrative embodiments of the present disclosure are now further described in conjunction with the accompanying drawings and specific implementations.

The illustrative embodiments will be described in detail herein, examples of which are shown in the accompanying drawings. When the following description refers to the drawings, the same numerals in different drawings represent the same or similar elements unless otherwise indicated. The implementations described in the following illustrative embodiments do not represent all implementations consistent with the embodiments of the present disclosure. Instead, they are merely examples of apparatus and methods consistent with some aspects of the present disclosure as detailed in the appended claims.

The terms used in the embodiments of the present disclosure are only for the purpose of describing specific embodiments and are not intended to limit the embodiments of the present disclosure. The singular forms of "a", "an" and "the" used in the embodiments of the present disclosure and the appended claims are intended to also include plural forms unless the context clearly indicates other meanings. It should also be understood that the term "and/or" used herein refers to and includes any or all possible combinations of one or more associated items listed.

It should be understood that although the terms first, second, third, etc. may be used to describe various information in the embodiments of the present disclosure, these information should not be limited to these terms. These terms are only used to distinguish the same type of information from each other. For example, without departing from the scope of the embodiments of the present disclosure, the first information may also be referred to as the second information, and similarly, the second information may also be referred to as the first information. Depending on the context, the word "if" as used herein may be interpreted as "at time of" or "when" or "in response to determining".

The embodiments of the present disclosure are described in detail below, and examples of the embodiments are shown in the accompanying drawings, where the same or similar reference numerals throughout represent the same or similar elements. The embodiments described below with reference to the accompanying drawings are illustrative and are intended to be used to explain the present disclosure, and cannot be understood as limiting the present disclosure.

As shown in FIG. 1, a control method for multi-device collaboration provided in an embodiment of the present disclosure may be applied to a wireless communication system 100, which may include a first user equipment 101, a second user equipment 102, and a network device 103. The first user equipment 101 and the second user equipment 102 are configured to support carrier aggregation and may be connected to multiple carrier components of the network device 103, including a primary carrier component and one or more secondary carrier components.

It should be understood that the above wireless communication system 100 can be applied to both low-frequency scenarios and high-frequency scenarios. The application scenarios of the wireless communication system 100 include, but are not limited to, a long term evolution (LTE) system, a LTE frequency division duplex (FDD) system, a LTE time division duplex (TDD) system, a worldwide interoperability for micro wave access (WiMAX) communication system, a cloud radio access network (CRAN) system, a future fifth-generation (5G) system, a new radio (NR) communication system, a future evolved public land mobile network (PLMN) system or the like.

The first user equipment 101 and the second user equipment 102 as shown above may be a terminal, an access terminal, a terminal unit, a terminal station, a mobile station (MS), a remote station, a remote terminal, a mobile terminal, a wireless communication device, a terminal agent, a terminal device, or the like. The terminal device 101 may have a wireless transceiving function, and can perform communication with one or more network devices of one or more communication systems (such as wireless communication) and receive network services provided by the network devices, where the network devices here include but are not limited to the illustrated network device 103.

The first user equipment 101 or the second user equipment 102 may be a cellular phone, a cordless phone, a session initiation protocol (SIP) phone, a wireless local loop (WLL) station, a personal digital assistant (PDA) device, a handheld device with wireless communication function, a computing device or other processing device connected to a wireless modem, a vehicle-mounted device, a wearable device, a terminal device in a future 5G network, a terminal device in a future evolved PLMN network, or the like.

The network device 103 may be an access network device (or called an access network station). The access network device refers to a device that provides a network access function, such as a radio access network (RAN) base station, etc. The network device 103 may specifically include a base station (BS), or include a base station and a wireless resource management device for controlling the base station, etc. The network device 103 may also include a relay station (relay device), an access point, a base station in a future 5G network, a base station in a future evolved PLMN network, or an NR base station, etc. The network device 103 may be a wearable device or a vehicle-mounted device. The network device 103 may also be a communication chip with a communication module.

For example, the network device 103 includes but is not limited to: a next generation base station (gnodeB, gNB) in 5G, an evolved node B (eNB) in a LTE system, a radio network controller (RNC), a node B (NB) in a WCDMA system, a wireless controller under a CRAN system, a base station controller (BSC), a base transceiver station (BTS) in a GSM system or a CDMA system, a home base station (for example, home evolved nodeB, or home node B, HNB), a baseband unit (BBU), a transmitting and receiving point (TRP), a transmitting point (TP), a mobile switching center, or the like.

Different user equipments (UEs) may have different performance advantages, for example, some UEs have excellent camera performance, some have good sound quality, some have good display effects, and some have good satellite processing capabilities. Users may have multiple needs for different usage scenarios, for example, they need a mobile phone with strong camera capabilities when traveling, a good screen and sound quality when watching movies, and a mobile phone with good satellite processing capabilities when exploring or in the desert.

It is difficult to integrate multiple high-performance functions into one user equipment in terms of cost control and popularity. And for some user equipments, the corresponding high performance may be wasted.

Based on this, collaborative control between multiple user equipments can be performed to enable multiple user equipments to achieve high performance in different aspects. At present, the collaboration of multiple user equipments focuses on local area network interconnection (such as local area network games), and the user equipments perform their own tasks independently and cannot perform a common task in collaboration.

Figure 2:
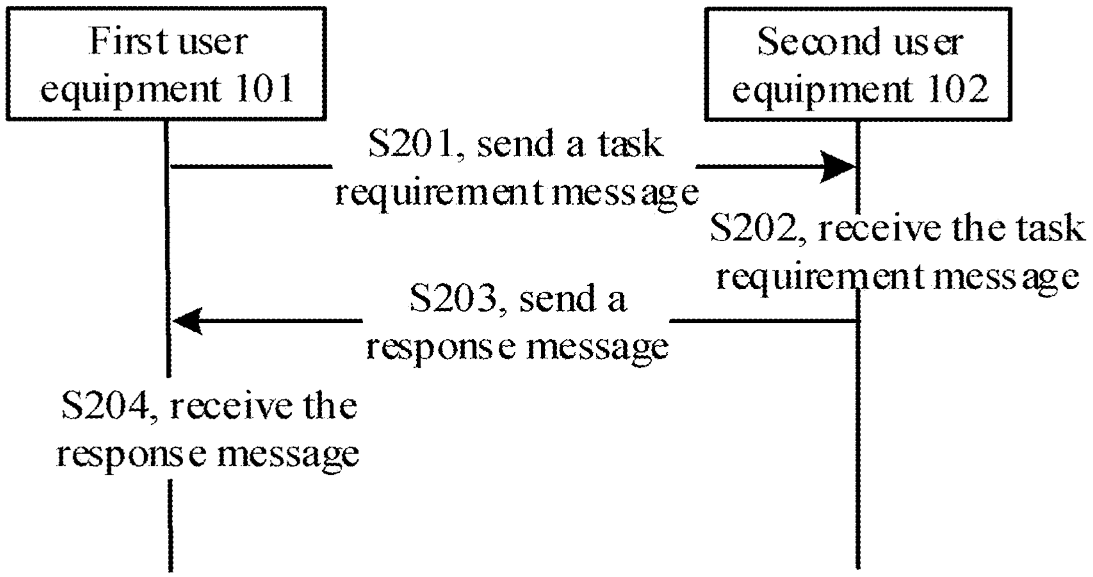
FIG. 2 is a flow chart showing a control method for multi-device collaboration according to an illustrative embodiment.

The embodiments of the present disclosure provide a control method for multi-device collaboration. Referring to FIG. 2, FIG. 2 is a control method for multi-device collaboration according to an illustrative embodiment. As shown in FIG. 2, the method includes steps S201 to S204, as follows.

Step S201, a first user equipment 101 sends a task requirement message to at least one second user equipment 102, where the task requirement message includes task information.

Step S202, the second user equipment 102 receives the task requirement message sent by the first user equipment 101, where the task requirement message includes the task information.

Step S203, the second user equipment 102 sends a response message to the first user equipment 101, where the response message includes equipment information of the second user equipment 102.

Step S204, the first user equipment 101 receives the response message from the at least one second user equipment 102, where the response message includes the equipment information of the second user equipment.

In some implementations, the task information includes, for example: a task type, task time, capability requirement information corresponding to the task required by the first user equipment 101, and the like.

In some implementations, the equipment information includes, for example: an equipment type of the second user equipment 102, equipment capability information, equipment performance parameters, etc. The equipment information can reflect the capability of the second user equipment 102 for performing tasks.

In some implementations, the first user equipment 101 may send the task requirement message through broadcast.

In an example, the first user equipment 101 sends a Bluetooth broadcast message, and the Bluetooth broadcast message includes the task requirement message.

In some implementations, the first user equipment 101 sends the task requirement message to the second user equipment 102 based on a network connection or a short-range wireless transmission technology.

In an example, the first user equipment 101 establishes a device-to-device (D2D) connection with the second user equipment 102, and sends the task requirement message in a D2D link with the second user equipment 102.

In this example, when the first user equipment 101 and the second user equipment 102 establish D2D out of network coverage, the first user equipment 101 can directly issue the task requirement message according to local configuration. Alternatively, when the first user equipment 101 and the second user equipment 102 establish D2D within network coverage, such as establishing a sidelink communication, the first user equipment 101 can first apply for an authorization code from the network device, and then issue the task requirement message after obtaining the authorization code.

In an example, the first user equipment 101 sends the task requirement message to the second user equipment 102 based on Wi-Fi technology, for example, sending the task requirement message through a Wi-Fi router.

In the embodiment of the present disclosure, the first user equipment 101 can indicate its own task requirements by issuing the task requirement message, so that the second user equipments 102 can respond thereto according to the task information in the task requirement message. The first user equipment 101 can accurately obtain the equipment information of each second user equipment 102 according to the response message, so that it can perform corresponding selection processing according to the equipment information, which is conducive to providing collaboration conditions for the first user equipment 101 and the second user equipment 102, thereby facilitating the collaborative execution of tasks through the second user equipment 102 so as to satisfy the demand of users in different scenarios.

An embodiment of the present disclosure proposes a control method for multi-device collaboration, including steps S201' to S206', as follows:

Step S201', a first user equipment 101 sends a task requirement message to at least one second user equipment 102, where the task requirement message includes task information.

Step S202', a network device 103 receives the task requirement message sent by the first user equipment 101, where the task requirement message includes the task information.

Step S203', the network device 103 issues the task requirement message.

Step S204', the second user equipment 102 receives the task requirement message issued by the network device 103.

Step S205', the second user equipment 102 sends a response message to the network device 103, where the response message includes equipment information of the second user equipment.

Step S206', the network device 103 receives the response message from the second user equipment 102, and sends the response message to the first user equipment 101.

In some implementations, the network device 103 may issue the task requirement message by broadcasting.

In the embodiment of the present disclosure, the first user equipment 101 and the second user equipment 102 implement information interaction via the network device 103, the first user equipment 101 issues the task requirement message through the network device 103, and the second user equipment 102 sends the response message to the first user equipment 101 through the network device 103. Thus, the first user equipment 101 can obtain the equipment information of each second user equipment 102, so that the first user equipment 101 can perform corresponding selection processing according to the equipment information, which is conducive to collaborative execution of the task through the second user equipment 102 so as to satisfy the demand of users in different scenarios. In addition, by issuing the message through the network device 103, the issuing scope of the task requirement message can be effectively expanded, which is conducive to obtaining more responses effectively.

An embodiment of the present disclosure proposes a control method for multi-device collaboration, including steps S201 to S212, as follows:

Step S201, a first user equipment 101 sends a task requirement message to at least one second user equipment 102, where the task requirement message includes task information.

Step S202, the second user equipment 102 receives the task requirement message sent by the first user equipment 101, where the task requirement message includes the task information.

Step S203, the second user equipment 102 sends a response message to the first user equipment 101, where the response message includes equipment information of the second user equipment 102.

Step S204, the first user equipment 101 receives the response message from at least one second user equipment 102, where the response message includes the equipment information of the second user equipment.

Step S205, the first user equipment 101 determines at least one collaborative equipment in the at least one second user equipment 102 according to the response message.

Step S206, the first user equipment 101 sends a corresponding task to be executed to the at least one collaborative equipment.

Step S207, in response to the second user equipment 102 being a collaborative equipment, the second user equipment 102 receives the corresponding task sent by the first user equipment 101.

Step S208, the first user equipment 101 sends a request message to a network device 103, where the request message includes the task information.

Step S209, the network device 103 receives the request message sent by the first user equipment 101, where the request message includes the task information.

Step S210, the network device 103 sends business data corresponding to the task information to the first user equipment 101 and the collaborative equipment according to the request message, where the collaborative equipment is a second user equipment 102 that is determined by the first user equipment 101 to be used for executing the task.

Step S211, the first user equipment 101 receives the business data corresponding to the task information sent by the network device 103.

Step S212, the second user equipment 102 receives the business data corresponding to the task information sent by the network device 103, and executes the task according to the business data.

In the embodiment of the present disclosure, the first user equipment 101 can indicate the task requirement to the second user equipment 102 by sending the task requirement message, and carry the task information in the task requirement message. After receiving the response message from at least one second user equipment 102, the first user equipment 101 can accurately obtain the equipment information of each second user equipment 102 according to the response message, so as to select a collaborative equipment in the second user equipments 102 according to the equipment information so as to perform the task through the collaborative equipment. In addition, the network device 103 can send the business data corresponding to the task information to the first user equipment 101 and the collaborative equipment determined by the first user equipment 101 according to the request message of the first user equipment 101, so that the first user equipment 101 and the collaborative equipment can both receive the business data corresponding to the task information of the first user equipment 101, and implement execution of the corresponding task through the collaborative equipment so as to satisfy the demand of users in different scenarios.

Figure 3:
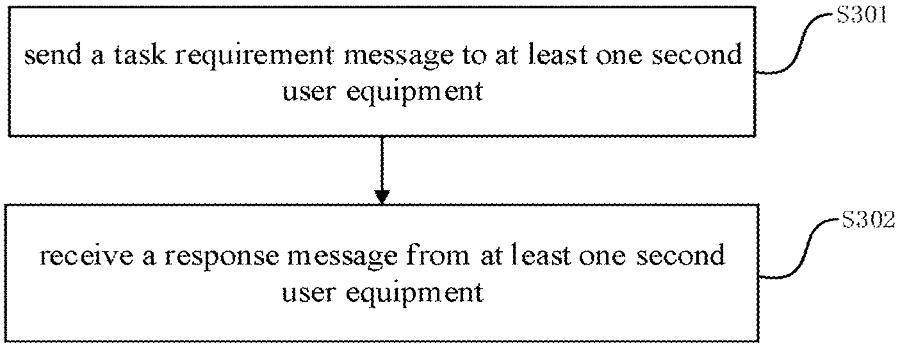
FIG. 3 is a flow chart showing a control method for multi-device collaboration according to an illustrative embodiment.

An embodiment of the present disclosure provides a control method for multi-device collaboration, which is performed by a first user equipment 101. Referring to FIG. 3, FIG. 3 shows a control method for multi-device collaboration according to an illustrative embodiment. As shown in FIG. 3, the method includes steps S301 to S302, as follows:

Step S301, a first user equipment 101 sends a task requirement message to at least one second user equipment 102, where the task requirement message includes task information.

Step S302, the first user equipment 101 receives a response message from at least one second user equipment 102, where the response message includes equipment information of the second user equipment.

In some implementations, the first user equipment 101 and the second user equipment 102 may communicate based on Bluetooth technology, D2D technology, mobile network or Wi-Fi technology.

In an example, the first user equipment 101 establishes D2D connection with multiple second user equipments 102, and sends the task requirement message to each second user equipment 102 through the D2D link. After receiving the task requirement message, the second user equipments 102 may reply a response message to the first user equipment 101, and carry their own equipment information in the response message.

In some implementations, the first user equipment 101 and the second user equipment 102 may both be smart phones, or the first user equipment 101 may be a mobile terminal such as a smart phone, a tablet computer, or a smart wearable device, and the second user equipment 102 may be a terminal such as a smart phone, a smart wearable device, a smart home product, a smart speaker, or a Bluetooth earphone.

In some implementations, the task indicated by the task information of the first user equipment 101 may be a video task, an audio task, an image display task, a storage task, a shooting task, a processing task by a central processing unit (CPU), etc.

In some implementations, the task information may include task identification, a task type, task capability requirement information, task time and location, and other information.

In some implementations, the equipment information may include device identification, an equipment name, an equipment type, equipment capability information, equipment performance parameters, and other information.

In the embodiment of the present disclosure, the first user equipment 101 can indicate its own task requirements by issuing the task requirement message, so that the second user equipments 102 can respond thereto according to the task information in the task requirement message. The first user equipment 101 can accurately obtain the equipment information of each second user equipment 102 according to the response message, so that it can perform corresponding selection processing according to the equipment information, which is conducive to providing collaborative conditions for the first user equipment 101 and the second user equipment 102, thereby facilitating the collaborative execution of tasks through the second user equipment 102 so as to meet the needs of users in different scenarios.

Figure 4:
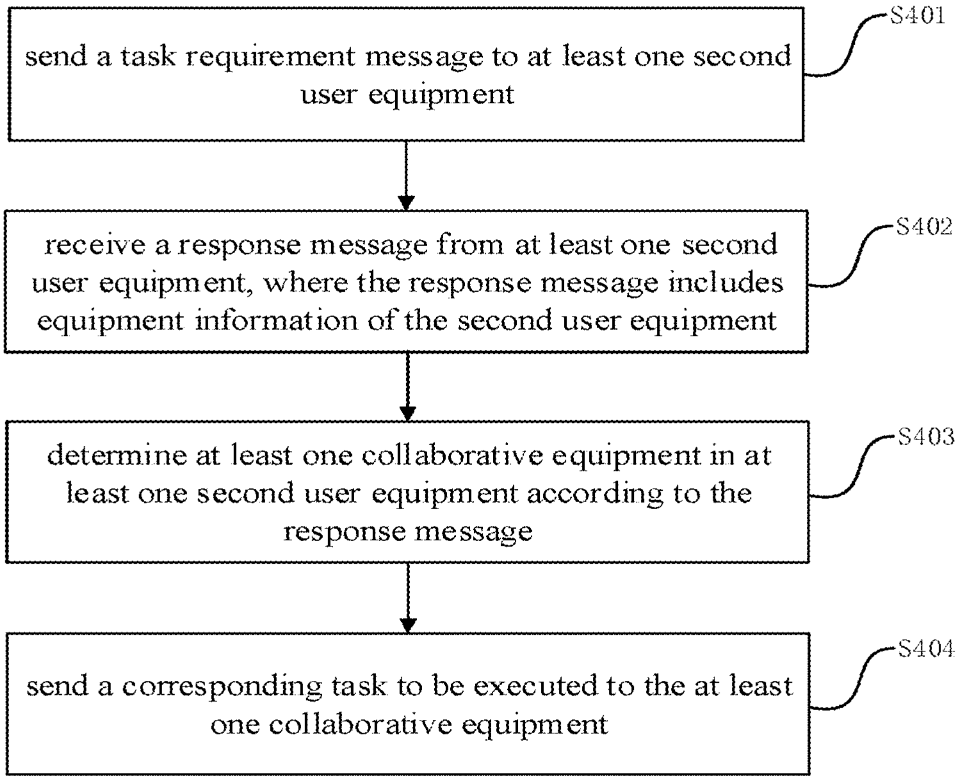
FIG. 4 is a flow chart showing a control method for multi-device collaboration according to an illustrative embodiment.

An embodiment of the present disclosure provides a control method for multi-device collaboration. Referring to FIG. 4, FIG. 4 shows a control method for multi-device collaboration according to an illustrative embodiment, the method is performed by a first user equipment 101, and as shown in FIG. 4, the method includes steps S401 to S404, as follows:

Step S401, a first user equipment 101 sends a task requirement message to at least one second user equipment 102, where the task requirement message includes task information.

Step S402, the first user equipment 101 receives a response message from at least one second user equipment 102, where the response message includes equipment information of the second user equipment.

Step S403, the first user equipment 101 determines at least one collaborative equipment in at least one second user equipment 102 according to the response message.

Step S404, the first user equipment 101 sends a corresponding task to be executed to the at least one collaborative equipment.

In some implementations, if the second user equipment 102 sends the response message, it indicates that the second user equipment 102 determines to participate in the task of the first user equipment 101.

In some implementations, the first user equipment 101 obtains the equipment information of at least one second user equipment 102 according to the response message of the at least one second user equipment 102, and selects some or all of the second user equipments 102 as the collaborative equipments according to the equipment information of the second user equipments 102.

In an example, the collaborative equipments selected from the second user equipment 102 are all used to perform the corresponding task.

In an example, some of the collaborative equipments selected from the second user equipment 102 are used to execute the corresponding task, and some are used as backup equipments. The backup equipments are used to execute the task at appropriate time in replacement of the collaborative equipments so as to better execute the task indicated by the first user equipment 101.

In some implementations, the first user equipment 101 divides the task to be executed (a total task) into multiple subtasks, assigns each of the subtasks to a corresponding collaborative equipment, and each collaborative equipment executes the corresponding subtask respectively, thereby executing the total task in collaboration with the first user equipment 101.

In the embodiment of the present disclosure, the first user equipment 101 can accurately obtain the equipment information of each second user equipment 102 according to the response message, so as to select the collaborative equipment in the second user equipments 102 according to the equipment information to execute the task through the collaborative equipment. Thus, different performances of different collaborative equipments can be utilized in a reasonable way to improve the execution effect of the task.

An embodiment of the present disclosure provides a control method for multi-device collaboration, which is performed by a first user equipment 101. The method includes steps S301 to S302, or the method includes steps S401 to S404, where the task information includes at least one or a combination of the following:

task identification;

a task type;

capability requirement information for the task;

task time; or a task location.

In some implementations, when creating task requirements, the first user equipment 101 generates a task requirement message based on the task identification, task type, task capability requirement information, task time, task location and other information, and issues the task requirement message carrying these task information.

In some implementations, the first user equipment 101 may pre-configure corresponding identifiers for different tasks.

In some implementations, the task type includes, for example: audio, video, user interface (UI) display, shooting, storage, CPU processing, satellite processing, etc.

In some implementations, the capability requirement information of the task corresponds to execution effect or execution parameters required by the first user equipment 101. The capability requirement information of the task has a correspondence with the task type. For different task types, the required capability requirement information is different.

In an example, when the task type is audio, the capability requirement information may indicate the required sound quality or sound effect, etc. For example, the capability requirement information includes a target sound quality and target sound effect of the audio.

In an example, when the task type is video, the capability requirement information may indicate the required resolution or definition, etc. For example, the capability requirement information includes a target resolution and target definition of the video.

In an example, when the task type is storage, the capability requirement information may indicate the required storage space size or storage format, etc. For example, the capability requirement information includes a target size of the storage space and a target storage format.

In an example, when the task type is shooting, the capability requirement information may indicate the required pixels or resolution, etc. For example, the capability requirement information includes target pixels, a target resolution, and a target camera type (such as telephoto, short focal length, or wide angle) for shooting, etc.

In an example, when the task type is UI display, the capability requirement information may indicate the required screen size or resolution, etc. For example, the capability requirement information includes a target size and target resolution of a screen.

In an example, when the task type is CPU processing, the capability requirement information may indicate the required CPU computing power or the number of CPU multi-core clusters, etc. For example, the capability requirement information includes the target computing power of the CPU.

In some implementations, the first user equipment 101 divides the task to be executed (a total task) into multiple subtasks, and assigns each subtask to a corresponding collaborative equipment. The task time may indicate the time for the total task and the time for each subtask.

In the embodiment of the present disclosure, the first user equipment 101 indicates a variety of task information in the task requirement message, so that after receiving the task requirement message, the second user equipment 102 can determine whether it can undertake the task based on its actual processing capability. In addition, the variety of task information also facilitates the first user equipment 101 to use the task information as a basis for evaluating the task processing capability of each second user equipment 102.

An embodiment of the present disclosure provides a control method for multi-device collaboration, which is performed by a first user equipment 101. The method includes steps S301 to S302, or the method includes steps S401 to S404, where the equipment information includes at least one or a combination of more than one of:

equipment identification;

an equipment name;

an equipment type;

equipment capability information; or equipment performance parameters.

In some implementations, the device identification (device ID) is used to uniquely identify the second user equipment 102.

In some implementations, the equipment name includes, for example, a manufacturer name and a model of the second user equipment 102.

In some implementations, the equipment type may indicate an electronic device type corresponding to the second user equipment 102. For example, the equipment type includes a smart phone, a smart wearable device, a smart speaker, or a wireless earphone.

In some implementations, the capability information of the equipment is used to indicate the capability of executing a task or processing a task.

In some implementations, the capability information of the equipment includes at least one or a combination of more than one of:

a supported task type;

a task type chosen to undertake;

supported task time; or a supported task location.

Therefore, the equipment capability information may indicate the task types that the second user equipment 102 can support, and the task time or task location at which the task can be performed.

In an example, the equipment capability information may also indicate the task willingness of the second user equipment 102, such as the type or identifier of the task that the second user equipment 102 actively chooses to undertake.

In some implementations, the performance parameters of the equipment include hardware structure parameters of the second user equipment 102, such as audio playback parameters, video playback parameters, screen parameters, shooting parameters, storage parameters, CPU parameters, or the like.

In an example, the audio playback parameters include sound effects and sound quality, the video playback parameters include a resolution and definition, the screen parameters include a size and resolution, the shooting parameters include pixels and resolution, the storage parameters include a storage space size and format, and the CPU parameters include CPU computing power and the number of multi-core clusters.

In some implementations, the first user equipment 101 divides the task to be executed (a total task) into multiple subtasks, and selects a suitable second user equipment to execute each subtask, that is, separately selects a collaborative equipment for each subtask.

In the embodiment of the present disclosure, the first user equipment 101 can obtain the processing or execution capabilities of each second user equipment 102 for different tasks based on the equipment information of each second user equipment 102, so that the first user equipment 101 can select a suitable second user equipment 102 for each subtask in a targeted and selective manner based on the task information, thereby making the best use of the performance of the second user equipment 102 and improving the execution effect of the task, so as to meet the needs of users in different scenarios.

The above application scenarios are described by way of the following examples.

Example 1

The first user equipment 101 is in a video playback scenario. When the first user equipment 101 issues a task requirement message, it carries the following task information in the task requirement message.

The task identification includes identification of the overall video task, identification of a video picture playback subtask, and identification of a video audio playback subtask. The task type is video. The capability requirement information includes the target resolution and target definition of the video, and the capability requirement information also includes the target sound quality and target sound effect of the audio in the video.

After the second user equipments 102 receive the task requirement message from the first user equipment 101, some or all of the second user equipments 102 whose processing capabilities meet the task information requirements may send a response message to the first user equipment 101. The response message carries the corresponding equipment information. For example:

The response message of a second user equipment A carries: equipment identification A, an equipment type of mobile phone, and equipment capability information that includes supporting video tasks and its own video resolution A and definition A.

The response message of a second user equipment B carries: equipment identification B, an equipment type of mobile phone, and equipment capability information that includes supporting video tasks and its own video resolution B and definition B.

The response message of a second user equipment C carries: equipment identification C, an equipment type of smart speaker, and equipment capability information that includes supporting audio tasks and its own sound quality C and sound effect C.

After the first user equipment 101 receives the response messages from the three second user equipments 102, assuming that it is known that the video resolution A of the second user equipment A is smaller than the video resolution B of the second user equipment B, the first user equipment 101 can thus select the second user equipment B and the second user equipment C as the collaborative equipments from the three equipments.

After selecting the collaborative equipments, the first user equipment 101 may divide the overall video task into a picture playing subtask and an audio playing subtask, assign the picture playing subtask to the second user equipment B, and assign the audio playing subtask to the second user equipment C.

Example 2

The first user equipment 101 is in a shooting scenario. When the first user equipment 101 issues a task requirement message, it carries the following task information in the task requirement message:

The task identification includes identification of the overall shooting task, identification of a shooting subtask, identification of a display subtask, and identification of a storage subtask. The task type is shooting. The capability requirement information includes the target pixels of shooting, the target resolution of the screen, and the target size of the storage space.

After the second user equipments 102 receive the task requirement message from the first user equipment 101, some or all of the second user equipments 102 whose processing capabilities meet the task information requirements may send a response message to the first user equipment 101. The response message carries the corresponding equipment information. For example:

The response message of the second user equipment A carries: equipment identification A, an equipment type of a shooting device, and equipment capability information that includes supporting shooting tasks and its own pixels A.

The response message of the second user equipment B carries: equipment identifier B, an equipment type of mobile phone, equipment capability information that includes supporting shooting tasks and display tasks, and also includes its own pixels B and screen resolution B.

The response message of the second user equipment C carries: equipment identification C, an equipment type of a storage device, and equipment capability information that includes supporting storage tasks and its own storage space size C.

After receiving the response messages from the three second user equipments 102, the first user equipment 101 may select all of the three equipments as collaborative equipments.

Assume that pixels B of equipment B are smaller than pixels A of device A. After selecting the collaborative equipments, the first user equipment 101 can divide the overall shooting task into a shooting subtask, a display subtask, and a storage subtask, and assign the shooting subtask to the second user equipment A, the display subtask to the second user equipment B, and the storage subtask to the second user equipment C.

Example 3

The first user equipment 101 is in a shooting scenario. When the first user equipment 101 issues a task requirement message, it carries the following task information in the task requirement message.

The task identification includes the identification of the overall shooting task, the identification of a shooting subtask, and the identification of a CPU processing subtask. The task type is shooting. The capability requirement information includes the target pixels of shooting and the target computing power of the CPU. The task time is t1.

After the second user equipments 102 receive the task requirement message from the first user equipment 101, some or all of the second user equipments 102 whose processing capabilities meet the task information requirements may send a response message to the first user equipment 101. The response message carries the corresponding equipment information. For example:

The response message of the second user equipment A carries: equipment identification A, equipment type of mobile phone, and equipment capability information that includes supporting shooting tasks, its own pixels A, and supported task time t2 ($t2 \neq t1$).

The response message of the second user equipment B carries: equipment identification B, equipment type of mobile phone, and equipment capability information that includes supporting supported shooting tasks, its own pixels B, and supported task time t1.

The response message of the second user equipment C carries: equipment identification C, equipment type of mobile phone, and equipment capability information including CPU computing power C and supported task time t1.

After receiving the response messages from the three second user equipments 102, the first user equipment 101 may select the second user equipments B and C as collaborative equipments because the task time supported by the second user equipment A deviates.

After selecting the collaborative equipments, the first user equipment 101 may divide the overall shooting task into a shooting subtask and a CPU processing subtask, and assign the shooting subtask to the second user equipment B and the CPU processing subtask to the second user equipment C.

In the embodiment of the present disclosure, the task of the first user equipment 101 is broken down into multiple subtasks, which are executed collaboratively by multiple collaborative equipments so as to utilize the performance of multiple second user equipments 102 in the maximum extent, thereby achieving an execution effect or user experience that reaches or exceeds that of performing the task by a single device.

Figure 5:
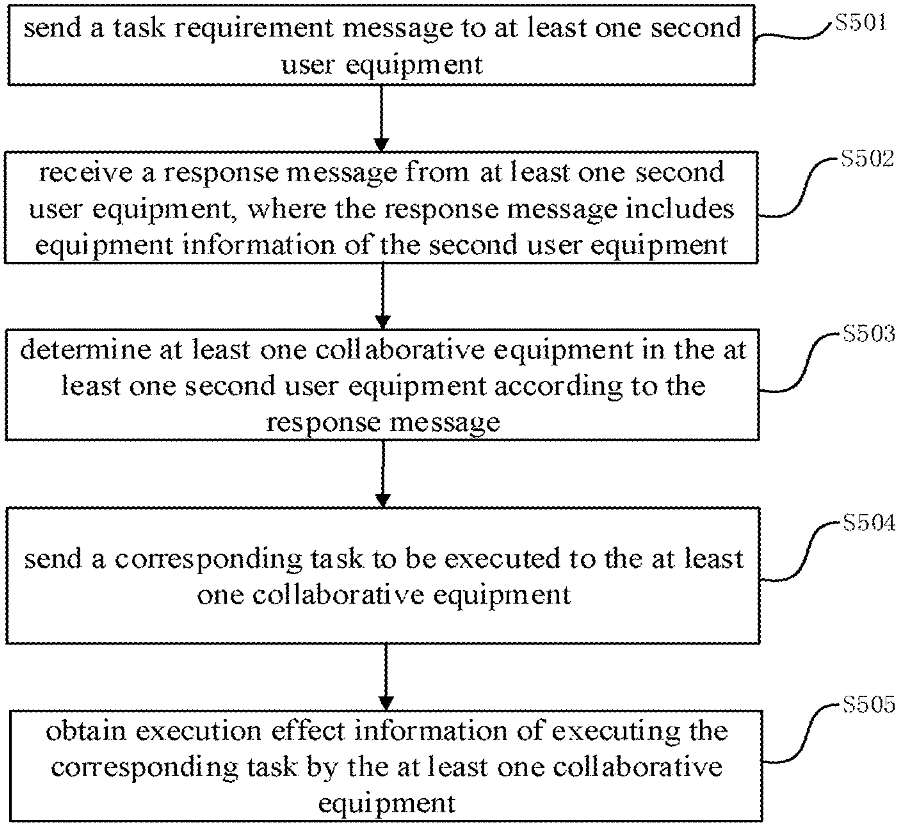
FIG. 5 is a flow chart showing a control method for multi-device collaboration according to an illustrative embodiment.

An embodiment of the present disclosure provides a control method for multi-device collaboration. Referring to FIG. 5, FIG. 5 is a control method for multi-device collaboration according to an illustrative embodiment, the method is performed by a first user equipment 101, and as shown in FIG. 5, the method includes steps S501 to S505, as follows.

Step S501, a first user equipment 101 sends a task requirement message to at least one second user equipment 102, where the task requirement message includes task information.

Step S502, the first user equipment 101 receives a response message from at least one second user equipment 102, where the response message includes equipment information of the second user equipment.

Step S503, the first user equipment 101 determines at least one collaborative equipment in the at least one second user equipment 102 according to the response message.

Step S504, the first user equipment 101 sends a corresponding task to be executed to the at least one collaborative equipment.

Step S505, execution effect information of executing the corresponding task by the at least one collaborative equipment is obtained.

In some implementations, the execution effect information is used to indicate the actual execution parameters of the second user equipment 102 during the task execution, that is, the device processing capacity that is actually exerted. The execution effect information can indicate whether the second user equipment 102 can continuously meet the task capacity requirement information when executing the corresponding task.

In an example, the task type is video. When the collaborative equipment execute the corresponding subtask, such as the picture playback subtask or the audio subtask, the definition or resolution of the picture playback during the execution always meets the target definition or target resolution required by the capability requirement information.

In an example, the task type is video. When the collaborative equipment executes the corresponding subtask, such as the picture playback subtask or the audio subtask, due to the change in the network speed of the environment, the definition or resolution of the picture playback is reduced during the execution process, and does not meet the target definition or target resolution required by the capability requirement information.

In the embodiment of the present disclosure, the first user equipment 101 can accurately learn the quality of task execution by multiple equipments in collaboration by acquiring the execution effect information when each collaborative equipment executes the corresponding task, which is conducive to maintaining the quality of task execution or making timely adjustments based on the quality of task execution.

An embodiment of the present disclosure provides a control method for multi-device collaboration, which is performed by a first user equipment 101. The method includes steps S501 to S506, as follows.

Step S501, a first user equipment 101 sends a task requirement message to at least one second user equipment 102, where the task requirement message includes task information.

Step S502, the first user equipment 101 receives a response message from at least one second user equipment 102, where the response message includes equipment information of the second user equipment.

Step S503, the first user equipment 101 determines at least one collaborative equipment in the at least one second user equipment 102 according to the response message.

Step S504, the first user equipment 101 sends a corresponding task to be executed to the at least one collaborative equipment.

Step S505, execution effect information of executing the corresponding task by the at least one collaborative equipment is obtained.

Step S506, when the execution effect information does not meet the capability requirement information of the corresponding task, a first prompt message is sent to the collaborative equipment corresponding to the execution effect information, where the first prompt message is used to indicate that the execution effect information of executing the task does not conform to the capability requirement information.

The task information includes the capability requirement information of the task.

In some implementations, the first user equipment 101 may send a prompt to the second user equipment 102 whose execution effect information does not meet corresponding requirements, for example, sending a first prompt message based on Bluetooth technology, D2D technology or a mobile network.

In the embodiment of the present disclosure, the collaborative equipment whose execution effect information of executing the task does not conform to the requirements can be prompted and informed by the first user equipment 101 in a timely manner, so that the collaborative equipment can promptly adjust the current execution effect after receiving the prompt, such as adjusting the access point and changing to an access point with faster network speed.

An embodiment of the present disclosure provides a control method for multi-device collaboration, which is performed by a first user equipment 101. The method includes steps S501 to S505 and step S507, as follows.

Step S501, a first user equipment 101 sends a task requirement message to at least one second user equipment 102, where the task requirement message includes task information.

Step S502, the first user equipment 101 receives a response message from at least one second user equipment 102, where the response message includes equipment information of the second user equipment.

Step S503, the first user equipment 101 determines at least one collaborative equipment in the at least one second user equipment 102 according to the response message.

Step S504, the first user equipment 101 sends a corresponding task to be executed to the at least one collaborative equipment.

Step S505, execution effect information of executing the corresponding task by the at least one collaborative equipment is obtained.

Step S507, when the execution effect information does not meet the capability requirement information of the corresponding task, first control information is sent to the collaborative equipment corresponding to the execution effect information, where the first control information is used to indicate the collaborative equipment corresponding to the execution effect information to disconnect.

The task information includes the capability requirement information of the task.

In the embodiment of the present disclosure, the collaborative equipment whose execution effect information does not meet the capability requirement information during task execution can be controlled by the first user equipment 101 to disconnect from it so as to stop executing the corresponding task through the collaborative equipment.

An embodiment of the present disclosure provides a control method for multi-device collaboration, which is performed by a first user equipment 101. The method includes steps S501 to S505 and steps S507 to S509, as follows.

Step S501, a first user equipment 101 sends a task requirement message to at least one second user equipment 102, where the task requirement message includes task information.

Step S502, the first user equipment 101 receives a response message from at least one second user equipment 102, where the response message includes equipment information of the second user equipment.

Step S503, the first user equipment 101 determines at least one collaborative equipment in the at least one second user equipment 102 according to the response message.

Step S504, the first user equipment 101 sends a corresponding task to be executed to the at least one collaborative equipment.

Step S505, execution effect information of executing the corresponding task by the at least one collaborative equipment is obtained.

Step S507, when the execution effect information does not meet the capability requirement information of the corresponding task, first control information is sent to the collaborative equipment corresponding to the execution effect information, where the first control information is used to indicate the collaborative equipment corresponding to the execution effect information to disconnect.

Step S508, a backup equipment in at least one collaborative equipment is determined.

Step S509, second control information is sent to the backup equipment, where the second control information is used to indicate the backup equipment to execute the task in replacement of the collaborative equipment corresponding to the execution effect information.

The task information includes the capability requirement information of the task.

In some implementations, when the first user equipment 101 determines the collaborative equipments from the second user equipments 102, the number of determined collaborative equipments may always be greater than the number of subtasks, so that the backup equipment can always be reserved in the selected collaborative equipments.

In some implementations, when there is a collaborative equipment whose execution effect information does not meet the capability requirement information, the first user equipment 101 determines a collaborative equipment from the second user equipments 102 as a backup equipment.

In some implementations, after determining the backup equipment, the first user equipment 101 reallocates the subtask corresponding to the collaborative equipment that do not meet the requirements to the backup equipment to execute the corresponding subtask through the backup equipment.

In the embodiment of the present disclosure, for the collaborative equipment whose execution effect information does not meet capability requirement information during task execution, the first user equipment 101 can control to replace the collaborative equipment in a timely manner so as to ensure the execution quality during the task execution.

An embodiment of the present disclosure provides a control method for multi-device collaboration, which is performed by a first user equipment 101. The method includes steps S401 to S404, and the method further includes the following.

Step S405, when the task execution is finished, third control information is sent to at least one collaborative equipment, where the third control information is used to indicate disconnection from the at least one collaborative equipment.

In the embodiment of the present disclosure, after the task required by the first user equipment 101 is completed, an event of ending the collaborative task may be initiated to disconnect from the collaborative equipments and release the resources of the collaborative equipments.

An embodiment of the present disclosure provides a control method for multi-device collaboration, which is performed by a first user equipment 101. The method includes steps S401 to S404, and the method further includes the following.

Step S406, the first user equipment 101 sends a request message to the network device 103, where the request message includes task information.

Step S407, the first user equipment 101 receives business data corresponding to the task information sent by the network device 103.

In some implementations, step S406 may be executed after step S404 or after step S401, or may be executed synchronously with step S401.

In some implementations, after receiving the business data, the first user equipment 101 may choose to perform the task together with the collaborative equipments, or the first user equipment 101 may only perform a control function and control the collaborative equipments to perform the task.

In some implementations, the second user equipment 102 may receive the business data sent by the network device 103, or the first user equipment 101 sends the received business data to the second user equipment 102.

In the embodiment of the present disclosure, after the first user equipment 101 selects the collaborative equipments, the collaborative equipments may also receive business data corresponding to the task information, thereby achieving collaborative effect and executing the corresponding task in coordination with the instructions of the first user equipment 101.

Figure 6:
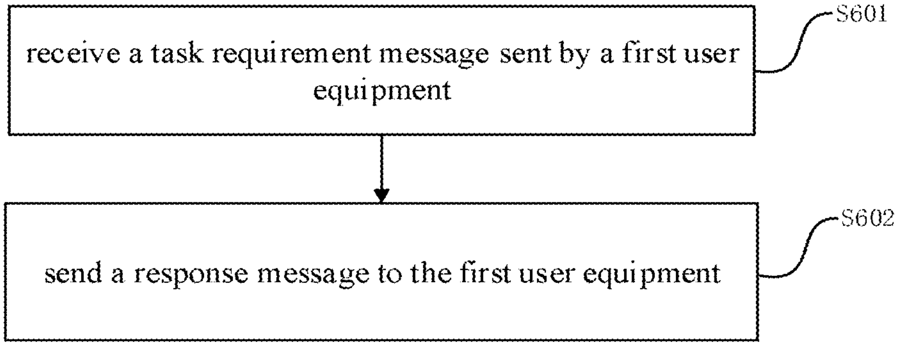
FIG. 6 is a flow chart showing a control method for multi-device collaboration according to another illustrative embodiment.

An embodiment of the present disclosure provides a control method for multi-device collaboration, which is performed by a second user equipment 102. Referring to FIG. 6, FIG. 6 shows a control method for multi-device collaboration according to an illustrative embodiment. As shown in FIG. 6, the method includes steps S601 to S602, as follows.

Step S601, the second user equipment 102 receives a task requirement message sent by a first user equipment 101, where the task requirement message includes task information.

Step S602, the second user equipment 102 sends a response message to the first user equipment 101, where the response message includes equipment information of the second user equipment 102.

In the method of the present disclosure, the second user equipment 102 can learn that the first user equipment 101 has a task requirement through the task requirement message, and can respond thereto according to the task information and its own equipment information. Thus, the first user equipment 101 can accurately learn the equipment information of each second user equipment 102, so as to perform corresponding selection processing according to the equipment information, which is conducive to providing collaborative conditions for the first user equipment 101 and the second user equipment 102, and further conducive to collaborative execution of the task through the second user equipment 102 so as to meet the needs of users in different scenarios.

An embodiment of the present disclosure provides a control method for multi-device collaboration, which is performed by a second user equipment 102. The method includes steps S601 to S604, as follows.

Step S601, the second user equipment 102 receives a task requirement message sent by a first user equipment 101, where the task requirement message includes task information.

Step S602, the second user equipment 102 sends a response message to the first user equipment 101, where the response message includes equipment information of the second user equipment 102.

Step S603, the second user equipment 102 receives a second prompt message from the first user equipment 101, where the second prompt message is used to indicate that the second user equipment is a collaborative equipment.

Step S604, the second user equipment 102 receives a corresponding task sent by the first user equipment 101, and executes the corresponding task.

In some implementations, according to the instructions of the first user equipment 101, a corresponding second prompt message is sent to the second user equipment 102 determined as a collaborative equipment. In addition, the first user equipment 101 also allocates a corresponding subtask to the collaborative equipment.

In the embodiment of the present disclosure, in combination with the equipment information sent by the second user equipment 102, the first user equipment 101 selects and determines the collaborative equipment according to the task information and the equipment information of each second user equipment 102, and the corresponding subtasks can be refined and executed by the collaborative equipment, which is conducive to exerting the performance advantages of the collaborative equipment and improving the task execution effect and user experience.

An embodiment of the present disclosure provides a control method for multi-device collaborative, which is performed by a second user equipment 102. The method includes steps S601 to S602, or includes steps S601 to S604, and the task information includes at least one or a combination of more than one of:

task identification;

a task type;

capability requirement information for the task;

task time; or a task location.

In the embodiment of the present disclosure, the first user equipment 101 indicates a variety of task information in the task requirement message, so that the second user equipment 102, after receiving the task requirement message, can determine whether it can undertake the task based on its actual processing capability.

An embodiment of the present disclosure provides a control method for multi-device collaboration, which is performed by a second user equipment 102. The method includes steps S601 to S602, or includes steps S601 to S604, where the equipment information includes at least one or a combination of more than one of:

equipment identification;

an equipment name;

an equipment type;

equipment capability information; or equipment performance parameters.

In some implementations, the equipment capability information includes at least one or a combination of more than one of:

a supported task type;

a task type chosen to undertake;

supported task time; or a supported task location.

In the embodiment of the present disclosure, the second user equipment 102 can report its own equipment information in accordance with the task requirement message. The first user equipment 101 can obtain the processing or execution capabilities of each second user equipment 102 for different tasks based on the equipment information of each second user equipment 102, so that the first user equipment 101 can select a suitable second user equipment 102 for each subtask in a targeted and selective manner in combination with the task information, thereby making the best use of the performance of the second user equipment 102 and improving the effect of task execution, so as to meet the needs of users in different scenarios.

An embodiment of the present disclosure provides a control method for multi-device collaboration, which is performed by a second user equipment 102. The method includes steps S601 to S605, as follows.

Step S601, the second user equipment 102 receives a task requirement message sent by a first user equipment 101, where the task requirement message includes task information.

Step S602, the second user equipment 102 sends a response message to the first user equipment 101, where the response message includes equipment information of the second user equipment 102.

Step S603, the second user equipment 102 receives a second prompt message from the first user equipment 101, where the second prompt message is used to indicate that the second user equipment is a collaborative equipment.

Step S604, the second user equipment 102 receives a corresponding task sent by the first user equipment 101, and executes the corresponding task.

Step S605, the second user equipment 102 sends execution effect information of executing the corresponding task to the first user equipment 101.

In some implementations, the second user equipment 102 serving as a collaborative equipment may monitor its own execution effect information in real time during the execution of the corresponding subtask, such as real-time monitoring of its own resolution or definition.

In the embodiment of the present disclosure, the second user equipment 102 can monitor the execution effect information of executing the task in real time, and report it to the first user equipment 101 in time, so that the first user equipment 101 can know the execution status of the task in time.

An embodiment of the present disclosure provides a control method for multi-device collaboration, which is performed by a second user equipment 102. The method includes steps S601 to S607, as follows.

Step S601, the second user equipment 102 receives a task requirement message sent by a first user equipment 101, where the task requirement message includes task information.

Step S602, the second user equipment 102 sends a response message to the first user equipment 101, where the response message includes equipment information of the second user equipment 102.

Step S603, the second user equipment 102 receives a second prompt message from the first user equipment 101, where the second prompt message is used to indicate that the second user equipment is a collaborative equipment.

Step S604, the second user equipment 102 receives a corresponding task sent by the first user equipment 101, and executes the corresponding task.

Step S605, the second user equipment 102 sends execution effect information of executing the corresponding task to the first user equipment 101.

Step S606, a first prompt message sent by the first user equipment 101 is received, where the first prompt message is used to indicate that the execution effect information of executing the task does not meet the capability requirement information of the corresponding task.

Step S607, the execution effect information during the execution of the task is adjusted according to the first prompt message so as to meet the capability requirement information of the corresponding task.

The task information includes the capability requirement information of the task.

In some implementations, the collaborative equipment that receives the first prompt message can make adjustments based on the reason for the change in the execution effect information. For example, if the execution effect information does not meet the requirements due to a slow access network speed, the access network can be adjusted to a network with better network status. For another example, if the processing pressure of the device itself increases, the currently running applications can be reduced to alleviate the processing pressure of the device itself.

In the embodiment of the present disclosure, for the collaborative equipment whose execution effect information does not meet the requirements, the first user equipment 101 will inform it of the current execution status of the task in the form of a prompt message, so that the collaborative equipment can adjust the execution status in time.

An embodiment of the present disclosure provides a control method for multi-device collaboration, which is performed by a second user equipment 102. The method includes steps S601 to S606 and steps S608 to S609, as follows.

Step S601, the second user equipment 102 receives a task requirement message sent by a first user equipment 101, where the task requirement message includes task information.

Step S602, the second user equipment 102 sends a response message to the first user equipment 101, where the response message includes equipment information of the second user equipment 102.

Step S603, the second user equipment 102 receives a second prompt message from the first user equipment 101, where the second prompt message is used to indicate that the second user equipment is a collaborative equipment.

Step S604, the second user equipment 102 receives a corresponding task sent by the first user equipment 101, and executes the corresponding task.

Step S605, the second user equipment 102 sends execution effect information of executing the corresponding task to the first user equipment 101.

Step S606, a first prompt message sent by the first user equipment 101 is received, where the first prompt message is used to indicate that the execution effect information of executing the task does not meet the capability requirement information of the corresponding task.

Step S608, first control information sent by the first user equipment 101 is received, where the first control information is used to indicate the collaborative equipment corresponding to the execution effect information to disconnect when the execution effect information does not meet the capability requirement information of the corresponding task.

Step S609, it disconnects from the first user equipment 101 according to the first control information.

The task information includes the capability requirement information of the task.

In the embodiment of the present disclosure, for the collaborative equipment whose execution effect information does not meet the capability requirement information during task execution, the first user equipment 101 can control to disconnect from it so as to stop executing the corresponding task through the collaborative equipment.

An embodiment of the present disclosure provides a control method for multi-device collaboration, which is performed by a second user equipment 102. The method includes steps S601 to S606 and steps S608 to S611, as follows.

Step S601, the second user equipment 102 receives a task requirement message sent by a first user equipment 101, where the task requirement message includes task information.

Step S602, the second user equipment 102 sends a response message to the first user equipment 101, where the response message includes equipment information of the second user equipment 102.

Step S603, the second user equipment 102 receives a second prompt message from the first user equipment 101, where the second prompt message is used to indicate that the second user equipment is a collaborative equipment.

Step S604, the second user equipment 102 receives a corresponding task sent by the first user equipment 101, and executes the corresponding task.

Step S605, the second user equipment 102 sends execution effect information of executing the corresponding task to the first user equipment 101.

Step S606, a first prompt message sent by the first user equipment 101 is received, where the first prompt message is used to indicate that the execution effect information of executing the task does not meet the capability requirement information of the corresponding task.

Step S608, first control information sent by the first user equipment 101 is received, where the first control information is used to indicate the collaborative equipment corresponding to the execution effect information to disconnect when the execution effect information does not meet the capability requirement information of the corresponding task.

Step S609, it disconnects from the first user equipment 101 according to the first control information.

Step S610, second control information sent by the first user equipment 101 is received, where the second control information is used to indicate that when the execution effect information does not meet the capability requirement information of the corresponding task, the task is executed by a backup equipment determined in the at least one collaborative equipment in replacement of the collaborative equipment corresponding to the execution effect information.

Step S611, the task corresponding to the execution effect information is executed according to the second control information.

In some implementations, when the second control information is received, it indicates that the second user equipment 102 serves as a backup equipment and performs the corresponding task as a backup equipment.

In the embodiment of the present disclosure, for the collaborative equipment whose execution effect information does not meet capability requirement information during task execution, the first user equipment 101 may control to change the collaborative equipment in time so as to ensure the execution quality during the task execution.

An embodiment of the present disclosure provides a control method for multi-device collaboration, which is performed by a second user equipment 102. The method may include steps S601 to S604, as follows.

Step S601, the second user equipment 102 receives a task requirement message sent by a first user equipment 101, where the task requirement message includes task information.

Step S602, the second user equipment 102 sends a response message to the first user equipment 101, where the response message includes equipment information of the second user equipment 102.

Step S603, the second user equipment 102 receives a second prompt message from the first user equipment 101, where the second prompt message is used to indicate that the second user equipment is a collaborative equipment.

Step S604, the second user equipment 102 receives a corresponding task sent by the first user equipment 101, receives business data corresponding to the task information sent by a network device 103, and executes the task according to the business data.

In the embodiment of the present disclosure, the second user equipment 102 that has been selected as a collaborative equipment can receive the business data sent by the network device 103, so that the collaborative equipment can perform the corresponding task according to the business data, thereby improving the efficiency of task execution.

Figure 7:
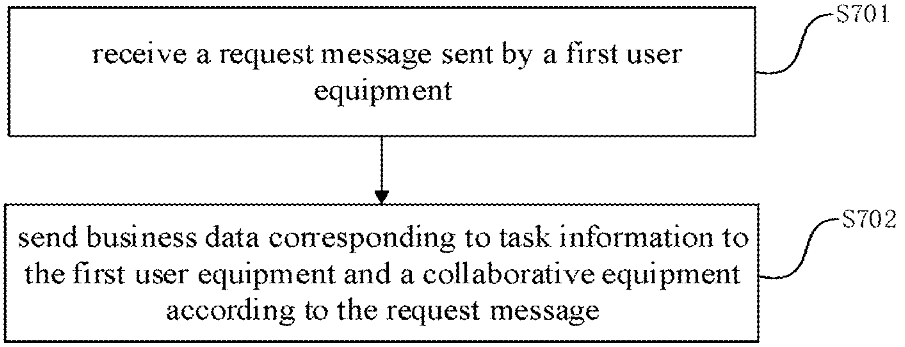
FIG. 7 is a flow chart showing a control method for multi-device collaboration according to another illustrative embodiment.

An embodiment of the present disclosure provides a control method for multi-device collaboration, which is performed by the network device 103. Referring to FIG. 7, FIG. 7 shows a control method for multi-device collaboration according to an illustrative embodiment. As shown in FIG. 7, the method includes steps S701 to S702, as follows.

Step S701, the network device 103 receives a task requirement message sent by a first user equipment 101, where the task requirement message includes task information.

Step S702, the network device 103 issues the task requirement message.

In an embodiment of the present disclosure, the method of issuing the message through the network device 103 can effectively expand the issuing scope of the task requirement message, which is conducive to obtaining more responses more effectively.

An embodiment of the present disclosure provides a control method for multi-device collaboration, which is performed by a network device 103. The method includes steps S701 to S704, as follows.

Step S701, the network device 103 receives a task requirement message sent by a first user equipment 101, where the task requirement message includes task information.

Step S702, the network device 103 issues the task requirement message.

Step S703, the network device 103 receives a response message sent by a second user equipment 102, where the response message includes equipment information of the second user equipment 102.

Step S704, the network device 103 sends the response message to the first user equipment 101.

In the embodiment of the present disclosure, the first user equipment 101 and the second user equipment 102 may implement information interaction through the network device 103, which is beneficial to improving the communication quality between the first user equipment 101 and the second user equipment 102.

An embodiment of the present disclosure provides a control method for multi-device collaboration, which is performed by a network device 103. The method includes steps S701 to S706, as follows.

Step S701, the network device 103 receives a task requirement message sent by a first user equipment 101, where the task requirement message includes task information.

Step S702, the network device 103 issues the task requirement message.

Step S703, the network device 103 receives a response message sent by a second user equipment 102, where the response message includes equipment information of the second user equipment 102.

Step S704, the network device 103 sends the response message to the first user equipment 101.

Step S705, the network device 103 receives a request message sent by the first user equipment 101, where the request message includes the task information.

Step S706, the network device 103 sends business data corresponding to the task information to the first user equipment 101 and a collaborative equipment according to the request message, where the collaborative equipment is a second user equipment 102 that is determined by the first user equipment 101 to be used for executing the task.

In the method of the present disclosure, the network device 103 can send business data corresponding to the task information to the first user equipment 101 and the collaborative equipment determined by the first user equipment 101 based on the request message of the first user equipment 101, so that both the first user equipment 101 and the collaborative equipment can receive the business data corresponding to the task information of the first user equipment 101.

Based on the same concept as the above method embodiments, an embodiment of the present disclosure also provides a control apparatus for multi-device collaboration, the apparatus can have the functions of the first user equipment 101 in the above method embodiments, and can be used to perform the steps performed by the first user equipment 101 provided in the above method embodiments. The functions can be implemented by hardware, by software or by hardware executing corresponding software. The hardware or software includes one or more modules corresponding to the above functions.

Figure 8:
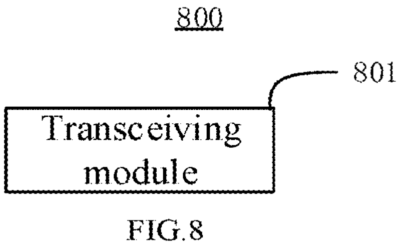
FIG. 8 is a structural diagram showing a control apparatus for multi-device collaboration according to an illustrative embodiment.

In a possible implementation, the apparatus 800 shown in FIG. 8 may be used as the first user equipment 101 involved in the above method embodiments, and perform the steps performed by the first user equipment 101 in the above method embodiments. As shown in FIG. 8, the apparatus 800 may include a transceiving module 801, which may be used to support communication by the communication apparatus 800, and the transceiving module 801 may have a wireless communication function, for example, the transceiving module 801 may be able to communicate wirelessly with other communication apparatuses through a wireless air interface.

When performing the steps implemented by the first user equipment 101, the transceiving module 801 is configured to send a task requirement message to at least one second user equipment 102, and the task requirement message includes task information; the transceiving module 801 is further configured to receive a response message from at least one second user equipment, and the response message includes equipment information of the second user equipment.

Figure 9:
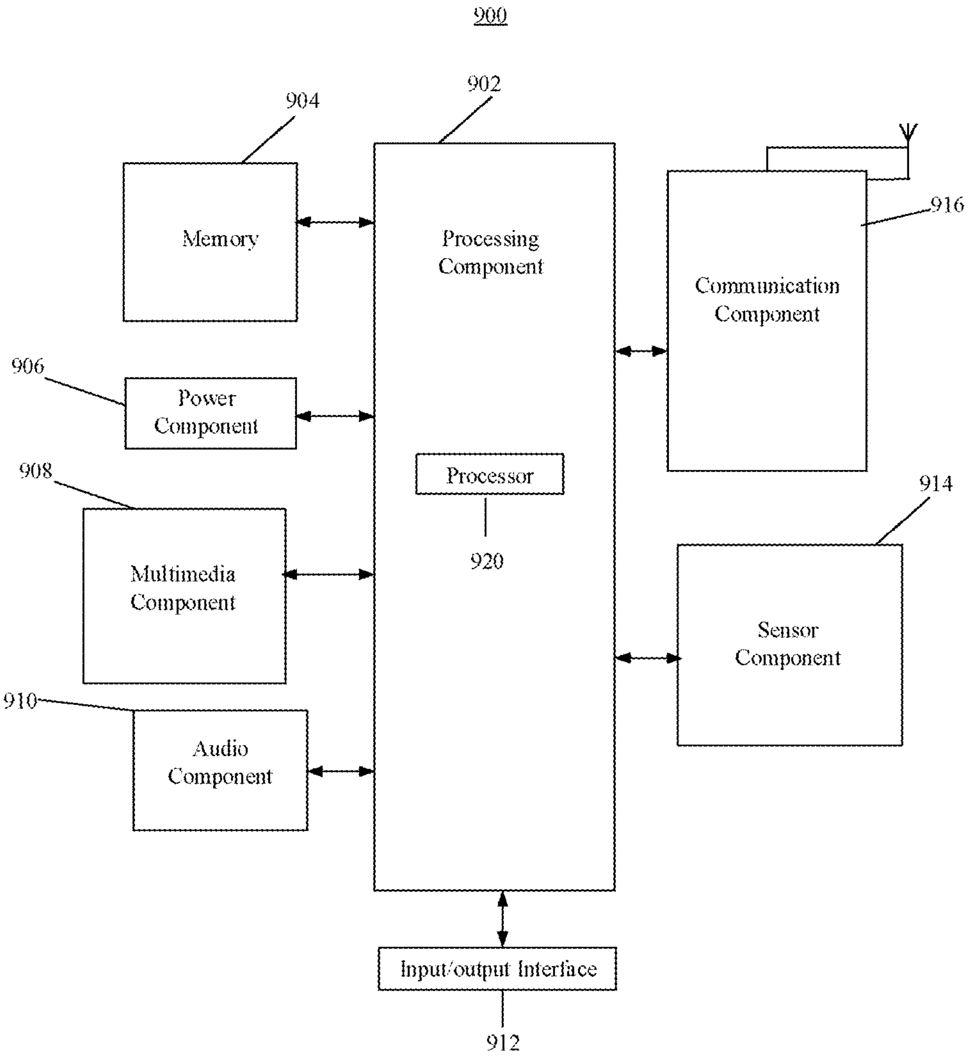
FIG. 9 is a block diagram of an electronic device according to an illustrative embodiment.

When the control apparatus for multi-device collaboration is the first user equipment 101, its structure may also be as shown in FIG. 9. The apparatus 900 may be a mobile phone, a computer, a digital broadcast terminal, a messaging device, a game console, a tablet device, a medical device, a fitness device, a personal digital assistant, etc.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 generally controls the overall operation of the apparatus 900, such as operations associated with display, phone calls, data communications, camera operations, and recording operations. The processing component 902 may include one or more processors 920 to execute instructions to complete all or part of the steps of the above-mentioned methods. In addition, the processing component 902 may include one or more modules to facilitate the interaction between the processing component 902 and other components. For example, the processing component 902 may include a multimedia module to facilitate the interaction between the multimedia component 908 and the processing component 902.

The memory 904 is configured to store various types of data to support operations on the apparatus 900. Examples of such data include instructions for any application or method operating on the apparatus 900, contact data, phone book data, messages, pictures, videos, etc. The memory 904 can be implemented by any type of volatile or non-volatile storage device or a combination thereof, such as astatic random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 906 provides power to various components of the apparatus 900. The power component 906 may include a power management system, one or more power supplies, and other components associated with generating, managing, and distributing power for the apparatus 900.

The multimedia component 908 includes a screen that provides an output interface between the apparatus 900 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, slide, and gestures on the touch panel. The touch sensor may not only sense the boundaries of the touch or slide action, but also detect the duration and pressure associated with the touch or slide operation. In some embodiments, the multimedia component 908 includes a front camera and/or a rear camera. When the apparatus 900 is in an operating mode, such as a shooting mode or a video mode, the front camera and/or the rear camera may receive external multimedia data. Each of the front camera and rear camera may be a fixed optical lens system or have a focal length and optical zoom capability.

The audio component 910 is configured to output and/or input audio signals. For example, the audio component 910 includes a microphone (MIC), and when the apparatus 900 is in an operating mode, such as a call mode, a recording mode, and a speech recognition mode, the microphone is configured to receive external audio signals. The received audio signals can be further stored in the memory 904 or sent via the communication component 916. In some embodiments, the audio component 910 also includes a speaker for outputting audio signals.

The I/O interface 912 provides an interface between the processing component 902 and peripheral interface modules, which may be a keyboard, a click wheel, buttons, etc. These buttons may include but are not limited to: a home button, a volume button, a start button, and a lock button.

The sensor component 914 includes one or more sensors for providing status assessment of various aspects for the apparatus 900. For example, the sensor component 914 can detect the open/closed state of the apparatus 900, the relative positioning of components, such as the display and keypad of the apparatus 900, and the sensor component 914 can also detect a change in position of the apparatus 900 or a component of the apparatus 900, the presence or absence of user contact with the apparatus 900, the orientation or acceleration/deceleration of the apparatus 900, and the temperature change of the apparatus 900. The sensor component 914 may include a proximity sensor configured to detect the presence of a nearby object without any physical contact. The sensor component 914 may also include an optical sensor, such as a CMOS or CCD image sensor, for use in imaging applications. In some embodiments, the sensor component 914 may also include an accelerometer, a gyroscope sensor, a magnetic sensor, a pressure sensor, or a temperature sensor.

The communication component 916 is configured to facilitate wired or wireless communication between the apparatus 900 and other devices. The apparatus 900 can access a wireless network based on a communication standard, such as Wi-Fi, 2G or 3G, or a combination thereof. In an illustrative embodiment, the communication component 916 receives a broadcast signal or broadcast-related information from an external broadcast management system via a broadcast channel. In an illustrative embodiment, the communication component 916 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an illustrative embodiment, the apparatus 900 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components to perform the above methods.

In an illustrative embodiment, a non-transitory computer-readable storage medium including instructions is also provided, such as a memory 904 including instructions, and the instructions can be executed by a processor 920 of the apparatus 900 to perform the above methods. For example, the non-transitory computer-readable storage medium can be a ROM, a random access memory (RAM), a CD-ROM, a magnetic tape, a floppy disk, an optical data storage device, etc.

Based on the same concept as the above method embodiments, the embodiments of the present disclosure also provides a control apparatus for multi-device collaboration, the apparatus can have the function of the second user equipment 102 in the above method embodiments, and can be configured to perform the steps performed by the second user equipment 102 provided in the above method embodiments. The function can be implemented by hardware, by software or by hardware executing corresponding software. The hardware or software includes one or more modules corresponding to the above functions.

Figure 10:
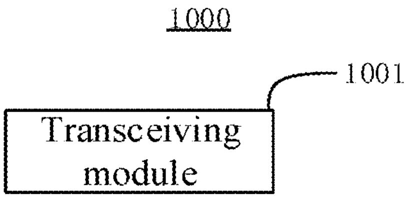
FIG. 10 is a structural diagram showing a control apparatus for multi-device collaboration according to an illustrative embodiment.

In a possible implementation, the apparatus 1000 shown in FIG. 10 may be used as the second user equipment 102 involved in the above method embodiments, and perform the steps performed by the second user equipment 102 in the above method embodiments. As shown in FIG. 10, the apparatus 1000 may include a transceiving module 1001, the transceiving module 1001 may be configured to support communication by the communication apparatus 1000, and the transceiving module 1001 may have a wireless communication function, for example, the transceiving module 1001 may be able to communicate wirelessly with other communication devices through a wireless air interface.

When performing the steps implemented by the second user equipment 102, the transceiving module 1001 is configured to receive a task requirement message of a first user equipment, the task requirement message includes task information; and the transceiving module 1001 is further configured to send a response message to the first user equipment, the response message includes the equipment information of the second user equipment.

When the control apparatus for multi-device collaboration is the second user equipment 102, its structure may also be shown in FIG. 9.

Based on the same concept as the above method embodiments, the embodiments of the present disclosure also provide a control apparatus for multi-device collaboration, which can have the functions of the network device 103 in the above method embodiments, and can be configured to perform the steps performed by the network device 103 provided in the above method embodiments. The functions can be implemented by hardware, by software or by hardware executing corresponding software. The hardware or software includes one or more modules corresponding to the above functions.

Figure 11:
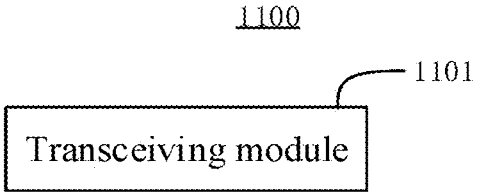
FIG. 11 is a structural diagram showing a control apparatus for multi-device collaboration according to an illustrative embodiment.

In a possible implementation, the communication apparatus 1100 shown in FIG. 11 may be used as the network device 103 involved in the above method embodiments, and perform the steps performed by the network device 103 in the above method embodiments. As shown in FIG. 11, the communication apparatus 1100 may include a transceiving module 1101, the transceiving module 1101 may be configured to support communication by the communication apparatus 1100, and the transceiving module 1101 may have a wireless communication function, for example, the transceiving module 1101 may be able to wirelessly communicate with other communication devices through a wireless air interface.

When performing the steps implemented by the network device 103, the transceiving module 1101 is configured to receive a task requirement message sent by a first user equipment, and the task requirement message includes task information; and the transceiving module 1101 is further configured to issue the task requirement message.

Figure 12:
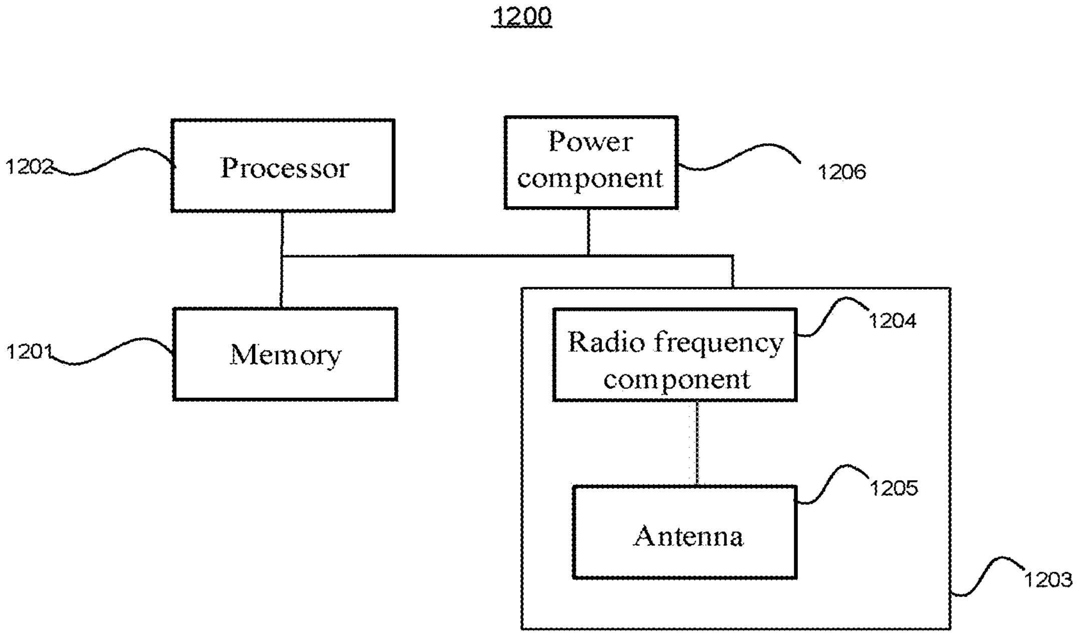
FIG. 12 is a block diagram showing a communication apparatus according to an illustrative embodiment.

When the communication apparatus is the network device 103, its structure can also be as shown in FIG. 12. Take the base station as an example to illustrate the structure of the communication apparatus. As shown in FIG. 12, the apparatus 1200 includes a memory 1201, a processor 1202, a transceiver component 1203, and a power component 1206. The memory 1201 is coupled to the processor 1202, and can be configured to store the programs and data necessary for the communication apparatus 1200 to implement various functions. The processor 1202 is configured to support the communication apparatus 1200 to perform the corresponding functions in the above methods, and the functions can be implemented by calling the program stored in the memory 1201. The transceiver component 1203 can be a wireless transceiver, which can be used to support the communication apparatus 1200 to receive signaling and/or data and send signaling and/or data through a wireless air interface. The transceiver component 1203 may also be referred to as a transceiver unit or a communication unit. The transceiver component 1203 may include a radio frequency component 1204 and one or more antennas 1205, where the radio frequency component 1204 may be a remote radio unit (RRU), which may be specifically used for transmission of radio frequency signals and conversion between radio frequency signals and baseband signals, and the one or more antennas 1205 may be specifically used for radiation and reception of radio frequency signals.

When the communication apparatus 1200 needs to send data, the processor 1202 can perform baseband processing on the data to be sent, and then output the baseband signal to the RF unit. The RF unit performs RF processing on the baseband signal and then sends the RF signal in the form of electromagnetic waves through the antenna. When data is sent to the communication apparatus 1200, the RF unit receives the RF signal through the antenna, converts the RF signal into a baseband signal, and outputs the baseband signal to the processor 1202. The processor 1202 converts the baseband signal into data and processes the data.

Those skilled in the art will readily appreciate other implementations of the embodiments of the present disclosure after considering the specification and practicing the disclosure disclosed herein. The present disclosure is intended to cover any variations, uses, or adaptations of the embodiments of the present disclosure, which follow the general principles of the embodiments of the present disclosure and include common knowledge or conventional technical means in the art that are not disclosed in the present disclosure. The specification and embodiments are to be considered as illustrative only, and the true scope and spirit of the embodiments of the present disclosure are specified by the following claims.

It should be understood that the embodiments of the present disclosure are not limited to the precise structures described above and shown in the drawings, and various modifications and changes may be made without departing from the scope thereof. The scope of the embodiments of the present disclosure is limited only by the appended claims.

INDUSTRIAL APPLICABILITY

In the methods disclosed in the present disclosure, the first user equipment can indicate its own task requirements by sending the task requirement message, so that the second user equipment can respond thereto according to the task information in the task requirement message. The first user equipment can accurately obtain the equipment information of each second user equipment according to the response message, so that it can perform corresponding selection processing according to the equipment information, which is conducive to providing collaborative conditions for the first user equipment and the second user equipment, thereby facilitating the collaborative execution of the task through the second user equipment so as to meet the needs of users in different scenarios.

What is claimed is:

1. A control method for multi-device collaboration, performed by a first user equipment, the method comprising:

sending, by the first user equipment, a task requirement message to at least one second user equipment through broadcast or a device-to-device (D2D) connection with the at least one second user equipment, wherein the task requirement message comprises task information including a task type and capability requirement information corresponding to the task type, and different task types are associated with different capability requirements;

receiving, by the first user equipment, a response message of the at least one second user equipment, wherein the response message comprises equipment information of the second user equipment including performance parameters of the second user equipment;

determining, via a processor of the first user equipment from among the at least one second user equipment, at least one collaborative equipment according to the task information and the equipment information;

dividing, via a processor of the first user equipment, a task corresponding to the task information into a plurality of subtasks associated with different capability requirements; and assigning, via the processor of the first user equipment, the plurality of subtasks to respective collaborative equipment in the at least one collaborative equipment for execution according to performance parameters of the collaborative equipment corresponding to the capability requirements.

2. The method according to claim 1, wherein the task information further comprises at least one of:

task identification;

task time; or a task location, or wherein the equipment information further comprises at least one of:

equipment identification;

an equipment name;

an equipment type; or equipment capability information.

3. The method according to claim 2, wherein the equipment capability information comprises at least one of:

a supported task type;

a task type chosen to undertake;

supported task time; or a supported task location.

4. The method according to claim 1, further comprising:

obtaining execution effect information of executing the corresponding task by the at least one collaborative equipment.

5. The method according to claim 4, further comprising:

in a case that the execution effect information does not meet the capability requirement information of the corresponding task, sending a first prompt message to the collaborative equipment corresponding to the execution effect information, wherein the first prompt message is used to indicate that the execution effect information of executing the task does not conform to the capability requirement information, or in a case that the execution effect information does not meet the capability requirement information of the corresponding task, sending first control information to the collaborative equipment corresponding to the execution effect information, wherein the first control information is used to indicate the collaborative equipment corresponding to the execution effect information to disconnect.

6. The method according to claim 5, further comprising:

determining a backup equipment in the at least one collaborative equipment; and sending second control information to the backup equipment, wherein the second control information is used to indicate the backup equipment to execute the task in replacement of the collaborative equipment corresponding to the execution effect information.

7. The method according to claim 1, further comprising:

in a case that execution of the task ends, sending third control information to the at least one collaborative equipment, wherein the third control information is used to indicate disconnection from the at least one collaborative equipment.

8. The method according to claim 1, further comprising:

sending a request message to a network device, wherein the request message comprises the task information; and receive business data corresponding to the task information sent by the network device.

9. An electronic device, comprising a processor and a memory, wherein:

the memory is configured to store a computer program; and the processor is configured to execute the computer program to implement the method according to claim 1.

10. A control method for multi-device collaboration, performed by a second user equipment, the method comprising:

receiving, by the second user equipment, a task requirement message from a first user equipment through broadcast or a device-to-device (D2D) connection with the first user equipment, wherein the task requirement message comprises task information including a task type and capability requirement information corresponding to the task type, and different task types are associated with different capability requirements;

sending, by the second user equipment, a response message to the first user equipment, wherein the response message comprises equipment information of the second user equipment including performance parameters of the second user equipment;

receiving, by the second user equipment, a second prompt message from the first user equipment, wherein the second prompt message is used to indicate that the second user equipment is determined as a collaborative equipment by the first user equipment according to the task information and the equipment information; and receiving, by the second user equipment, a corresponding subtask sent by the first user equipment and executing by the second user equipment, the corresponding subtask wherein the subtask is obtained from dividing a task corresponding to the task information into a plurality of subtasks associated with different capability requirements by the first user equipment, and is assigned to the second user equipment by the first user equipment according to the performance parameters of the second user equipment corresponding to the capability requirements.

11. The method according to claim 10, further comprising:

sending execution effect information of executing the corresponding subtask to the first user equipment.

12. The method according to claim 11, further comprising:

receiving a first prompt message sent by the first user equipment, wherein the first prompt message is used to indicate that the execution effect information of executing the subtask does not meet capability requirement information of the corresponding subtask; and adjusting, according to the first prompt message, the execution effect information in a process of executing the subtask to meet the capability requirement information of the corresponding task, or receiving first control information sent by the first user equipment, wherein the first control information is used to indicate disconnection from the collaborative equipment corresponding to the execution effect information in a case that the execution effect information does not meet the capability requirement information of the corresponding subtask; and disconnecting from the first user equipment according to the first control information.

13. The method according to claim 12, further comprising:

receiving second control information sent by the first user equipment, wherein the second control information is used to indicate that the subtask is executed by a backup equipment determined in at least one collaborative equipment in replacement of the collaborative equipment corresponding to the execution effect information in a case that the execution effect information does not meet the capability requirement information of the corresponding subtask; and executing the subtask corresponding to the execution effect information according to the second control information.

14. The method according to claim 10, wherein executing the corresponding subtask comprises:

receiving business data corresponding to the task information sent by a network device, and executing the subtask task-according to the business data.

15. An electronic device, comprising a processor and a memory, wherein:

the memory is configured to store a computer program; and the processor is configured to execute the computer program to implement the method according to claim 10.

16. A control method for multi-device collaboration, performed by a network device, the method comprising:

receiving, by the network device, a task requirement message sent by a first user equipment, wherein the task requirement message comprises task information including a task type and capability requirement information corresponding to the task type, and different task types are associated with different capability requirements;

issuing, by the network device through broadcast, the task requirement message to at least one second user equipment;

receiving, by the network device, a response message sent by the at least one second user equipment, wherein the response message comprises equipment information of the second user equipment including performance parameters of the second user equipment:

sending, by the network device, the response message to the first user equipment;

receiving by the network device, a request message sent by the first user equipment, wherein the request message comprises the task information; and sending, by the network device according to the request message, business data corresponding to the task information to the first user equipment and a collaborative equipment, wherein the collaborative equipment is a second user equipment for executing a subtask determined by the first user equipment according to the task information and the equipment information, and the subtask is obtained from dividing a task corresponding to the task information into a plurality of subtasks associated with different capability requirements by the first user equipment and is assigned to the collaborative equipment by the first user equipment according to the performance parameters of the collaborative equipment corresponding to the capability requirements.

17. A communication apparatus, comprising a processor and a memory, wherein:

the memory is configured to store a computer program; and the processor is configured to execute the computer program to implement the method according to claim 16.

* * * * *